Nov. 12, 1935.  P. E. KLEINEBERG  2,020,321
GATHERING MACHINE
Filed Oct. 28, 1933   7 Sheets-Sheet 1
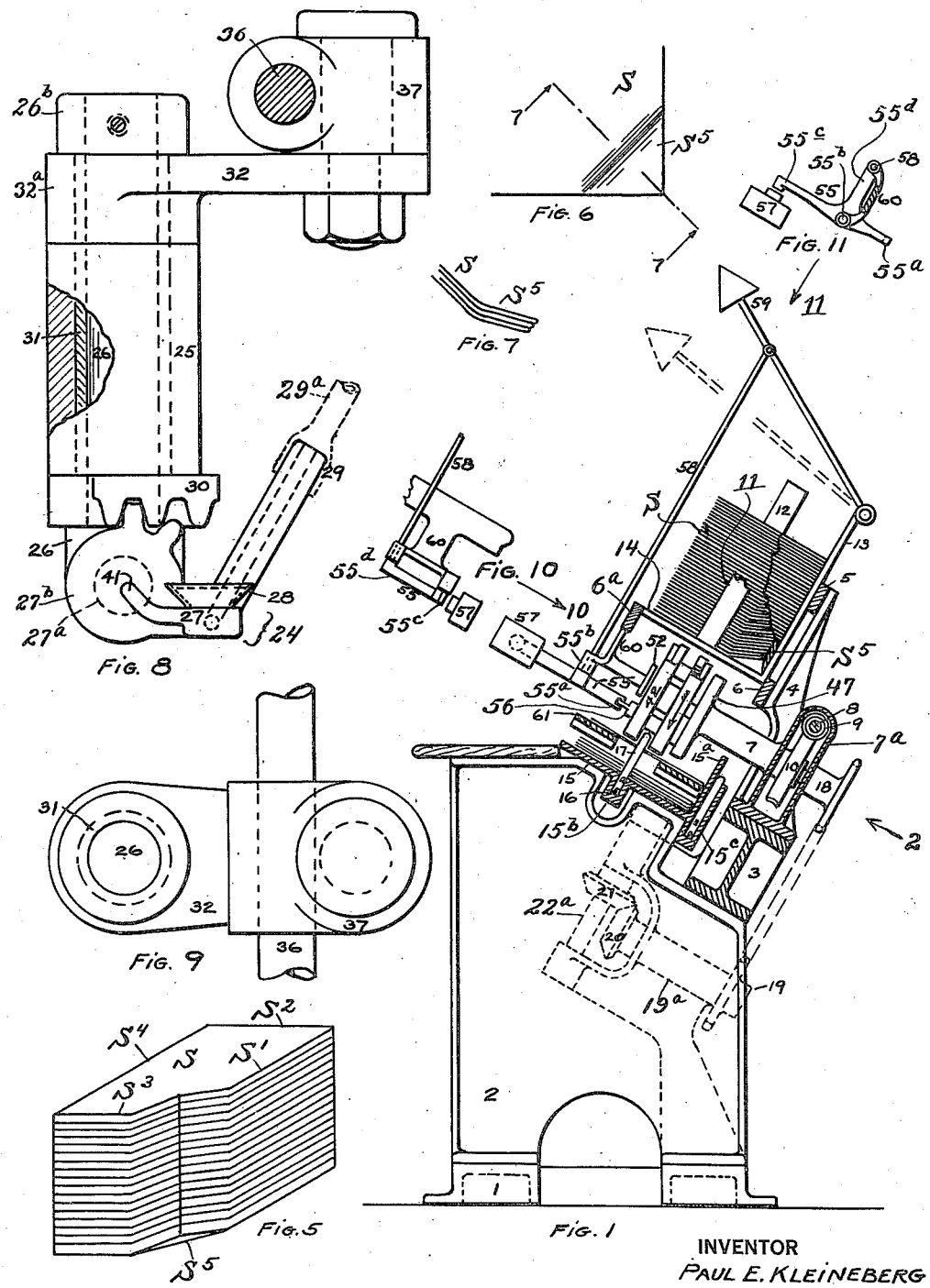
INVENTOR
PAUL E. KLEINEBERG
BY
ATTORNEYS.

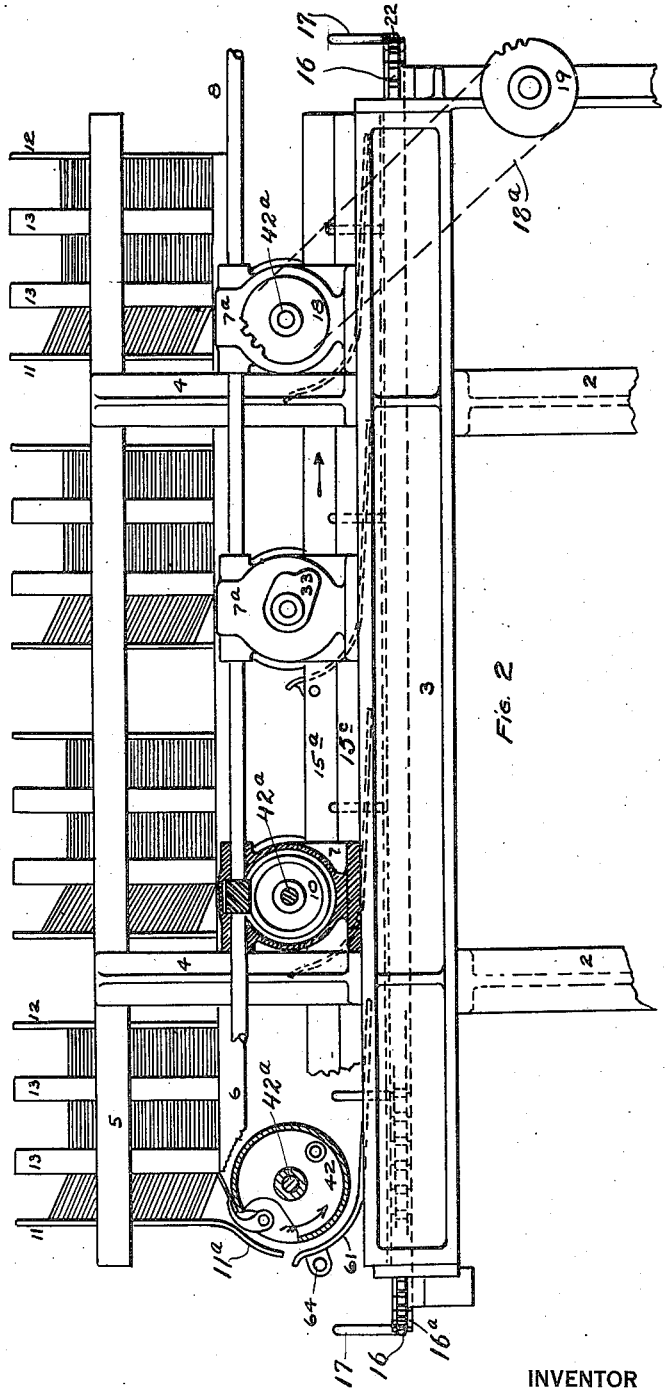

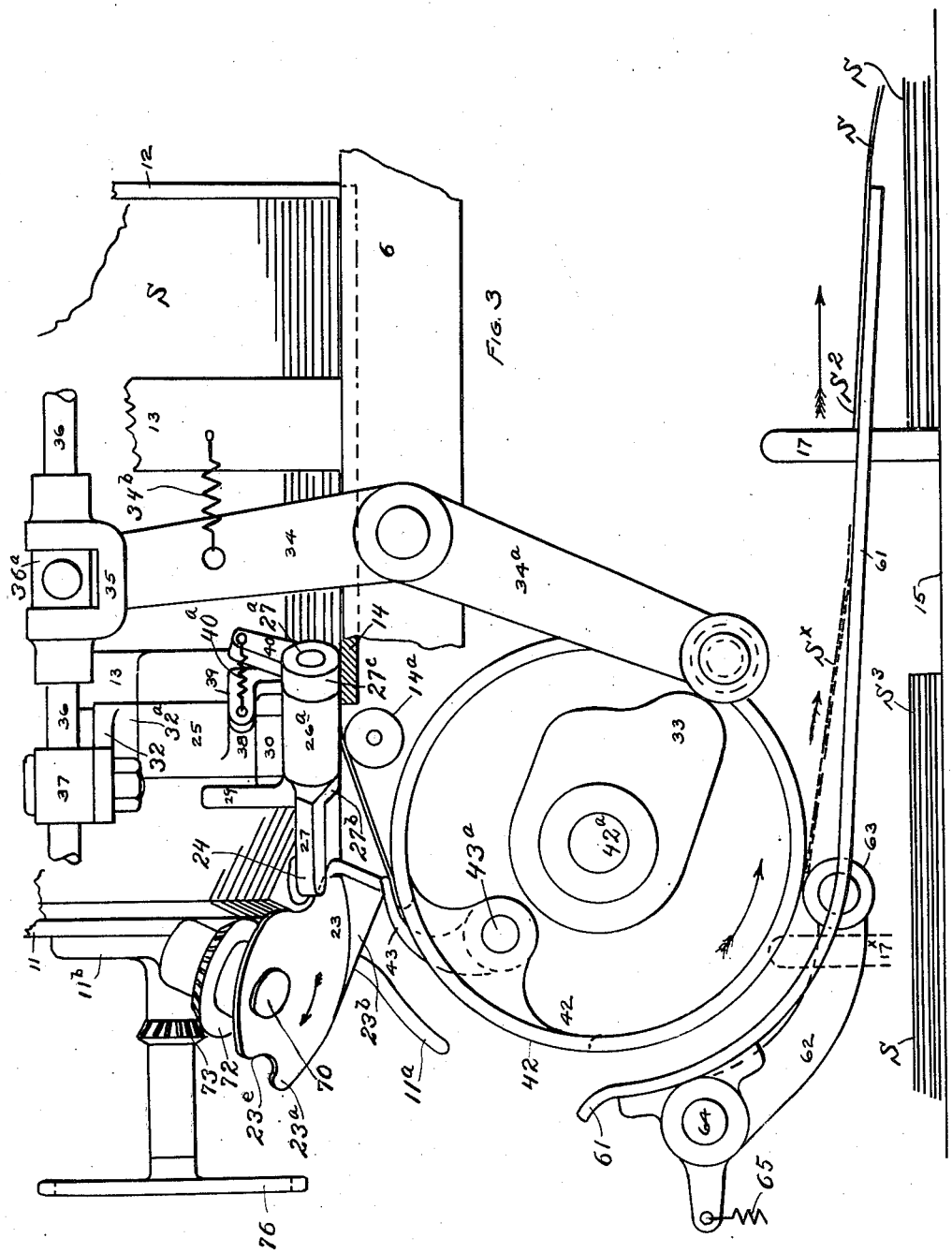

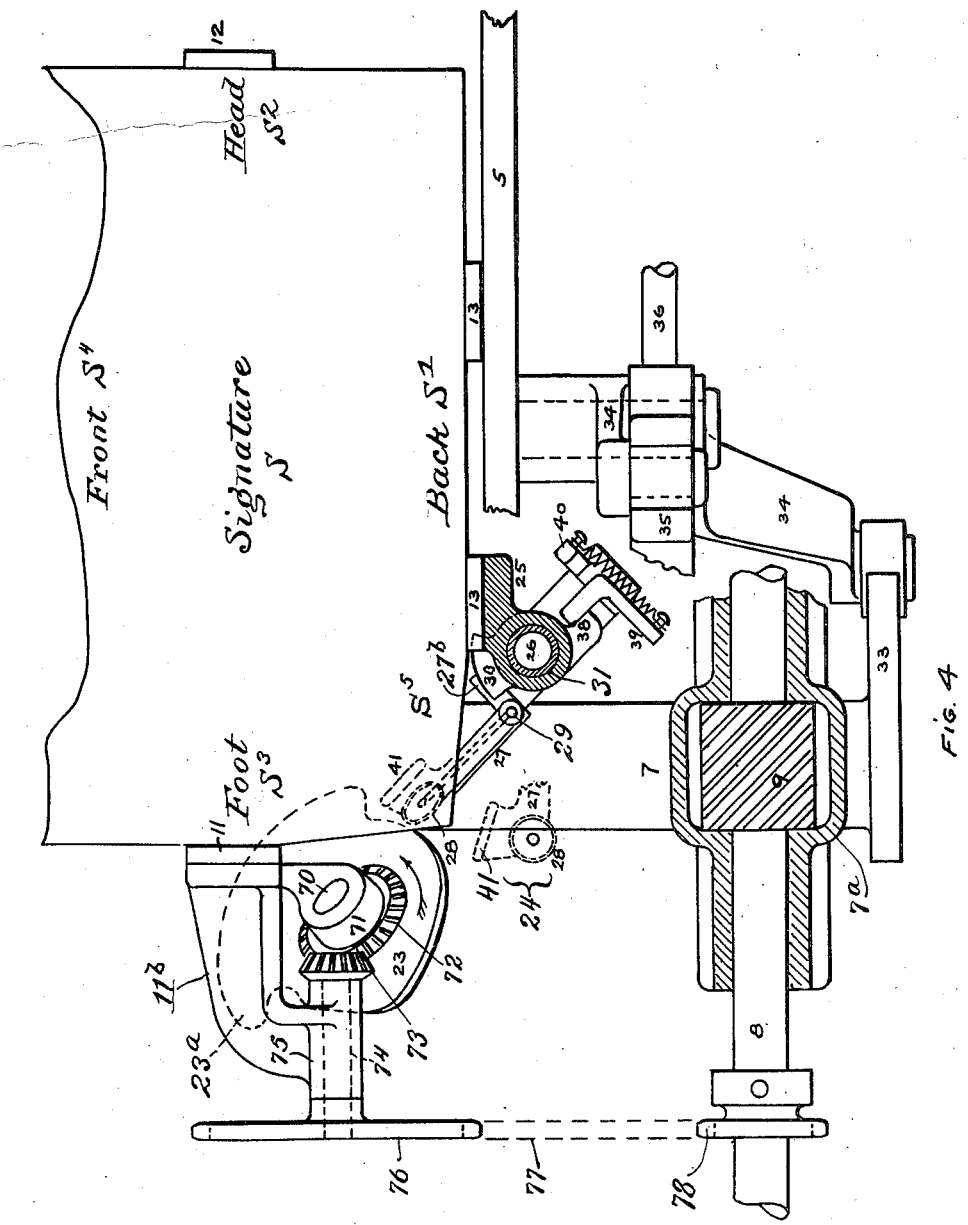

Nov. 12, 1935.   P. E. KLEINEBERG   2,020,321
GATHERING MACHINE
Filed Oct. 28, 1933   7 Sheets-Sheet 5
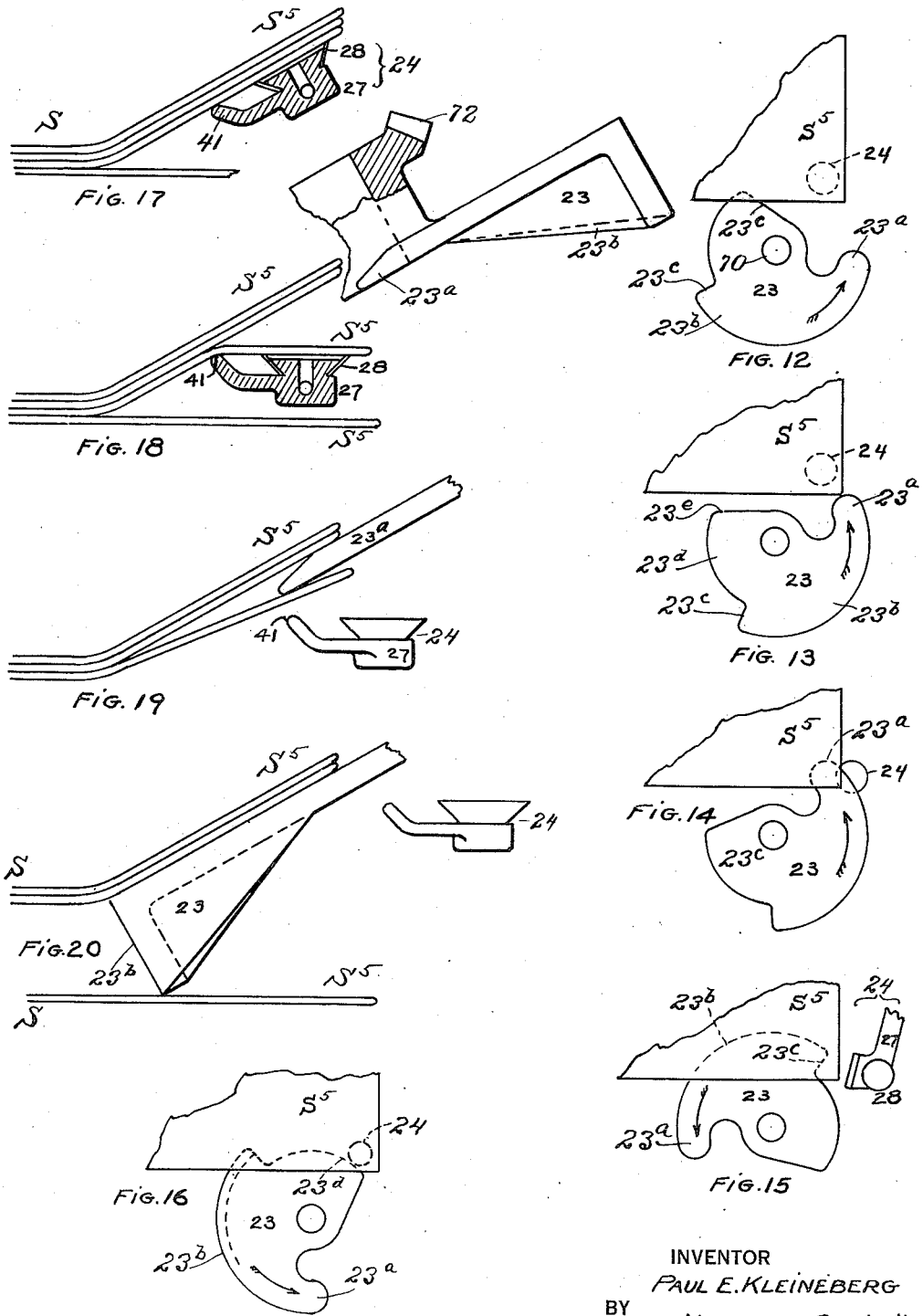
INVENTOR
PAUL E. KLEINEBERG
BY
Morrison, Kennedy & Campbell
ATTORNEYS.

Nov. 12, 1935.  P. E. KLEINEBERG  2,020,321
GATHERING MACHINE
Filed Oct. 28, 1933   7 Sheets-Sheet 6

INVENTOR
PAUL E. KLEINEBERG.
BY
Morrison, Kennedy & Campbell
ATTORNEYS.

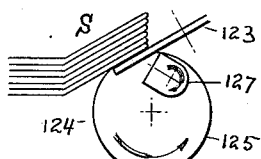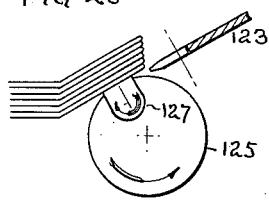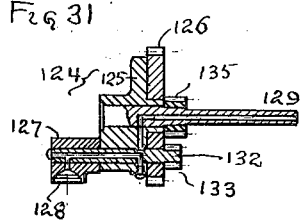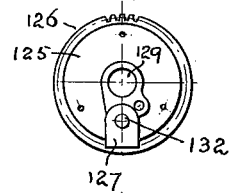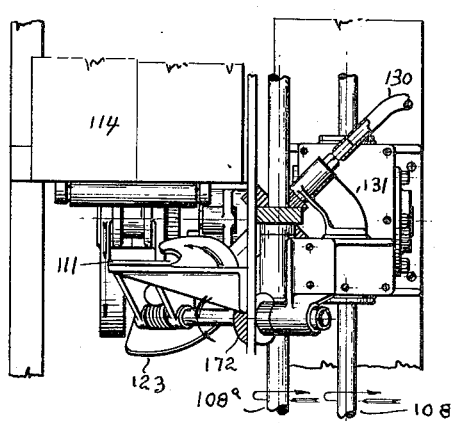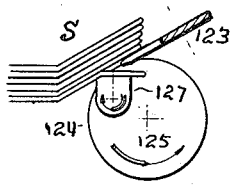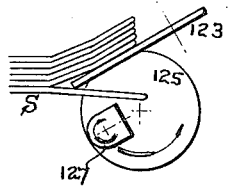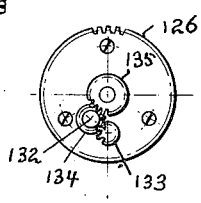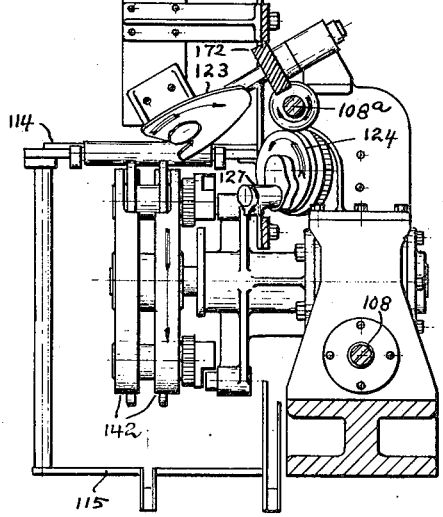

Patented Nov. 12, 1935

2,020,321

UNITED STATES PATENT OFFICE 2,020,321

GATHERING MACHINE

Paul E. Kleineberg, Easton, Pa., assignor to T. W. & C. B. Sheridan Company, New York, N. Y., a corporation of New York Application October 28, 1933, Serial No. 695,605

21 Claims. (Cl. 270—56)

This invention is a novel gathering machine, being an automatic, power-driven mechanism for separating and extracting successive signatures or sheets from stacks thereof in successive hoppers and delivering or depositing them cumulatively upon an advancing conveyor so as progressively to build up groups thereof, each group subsequently to be united into a book or analogous product. In the art of book manufacture it is common to operate a gathering machine in a manner to deliver in succession the completed signature groups directly to a suitable binding mechanism, such as a wire stitching or stapling mechanism, which applies staples to unite each signature group into a book, preferably while traveling; and the books frequently are later on covered in the same apparatus.

While the present invention embodies the generic features of gathering machines as above outlined, it constitutes an improvement over existing gatherers in several respects. A main object of the invention is to afford a gathering machine which will be smooth and quiet in operation, and will deliver an increased number of signature groups per minute, without increase of occupied floor space.

A particular object is to separate and extract the successive signatures from the respective hoppers in such manner that when delivered to the conveyor each signature will be in advancing movement, preferably as fast as or faster than that of the conveyor. This arrangement allows the advancing members or pins of the conveyor to be spaced more closely together, since no time or space has to be allowed for the settling of the delivered signatures. This permits, for a given conveyor speed, the gathering of a greater number of signature groups per minute, or, with the same rate of book output, permits the conveyor to be driven at a slower speed, thus improving the smoothness and accuracy of operation. The closer spacing of the conveyor pins allows the wire stitcher to be operated with a shorter stroke of its reciprocating head, thus allowing it to be operated with an increased output per minute in unison with the speed of the gatherer. Furthermore, by depositing each of the signatures upon the conveyor with an advancing movement the advantage is secured that impact of the conveyor pin against the signature is avoided, this preventing injury to or rumpling of the signature and insuring a better jogging and alining of the groups in the conveyor, and avoiding choking in the gatherer or at its delivery; while the tendency of a light signature to climb over an impacting conveyor pin is also eliminated.

Other and further objects and advantages of the present invention will be explained in the hereinafter following description of an illustrative embodiment thereof or will be apparent to those conversant with the subject. To the attainment of such objects and advantages the present invention consists in the novel gathering machine and the novel features of operation, combination, arrangement and construction herein illustrated or described.

In the accompanying drawings Figure 1 may be considered a left end elevation of a gathering machine embodying the present invention, with the separating means and certain other parts omitted for clearness, and with certain longitudinal parts shown in transverse section.

Fig. 2 is a front elevation taken however at an upward slant, in the direction of the arrow 2 on Fig. 1 and with certain parts shown in longitudinal section, and the separating means and certain other parts omitted.

Fig. 3, on an enlarged scale, is an inclined front elevation showing one hopper, the suction separator, the rotary separator, the rotary extractor and the means guiding and delivering each signature advancingly to the conveyor.

Fig. 4, on the same scale as Fig. 3, is a top view of the hopper and separating mechanism.

Fig. 5, in perspective, shows a stack of signatures with one corner thereof bent upwardly in the manner as supported in the hopper.

Fig. 6 is a top plan view of the corner of a signature stack of Fig. 5.

Fig. 7 is a section view of the signature group taken on the line 7—7 of Fig. 6.

Fig. 8 is a left end elevation on an enlarged scale of the suction separating device and connections.

Fig. 9 is a top plan view of the upper part of Fig. 8.

Figs. 10 and 11 are detail views looking in inclined directions along the arrows 10 and 11 respectively of Fig. 1.

Figs. 12 to 16 are a series of diagrams showing in top plan view the action of the separating means at various stages of operation.

Figs. 17 to 20 are a series of diagrams showing in diagonal vertical section, corresponding with the line 7—7 of Fig. 6, the action of the separating means at various stages of operation.

Figure 21:
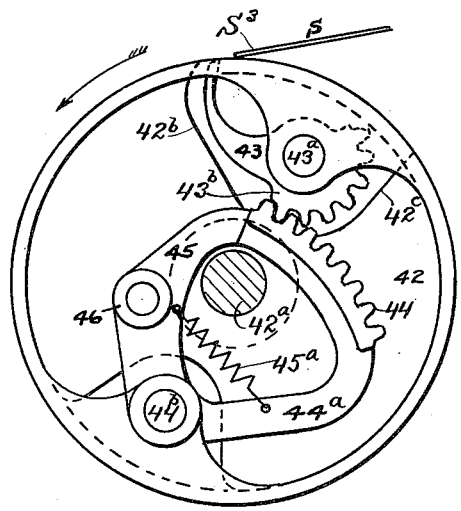
Figure 22:
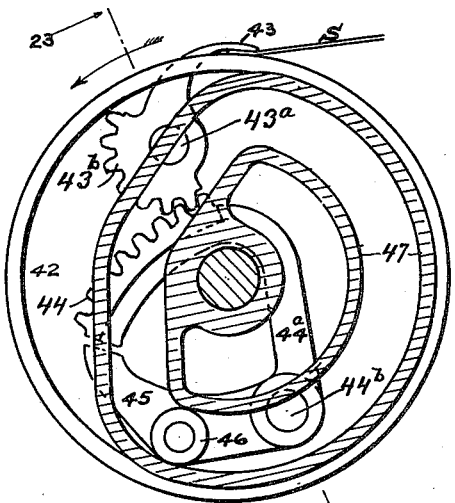
Figure 23:
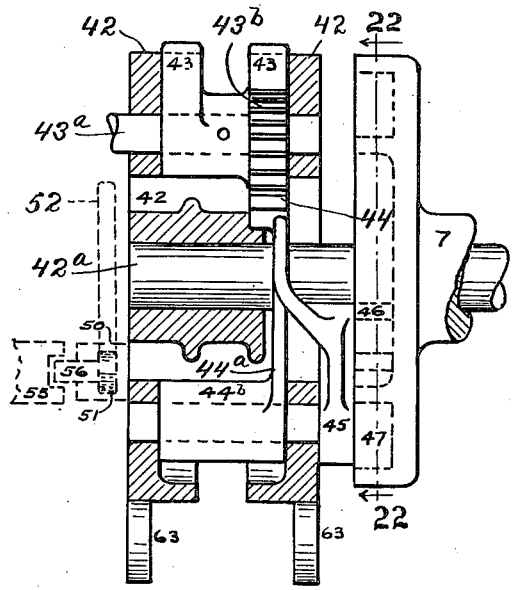

Fig. 21 is a front elevation of the rotary extractor, including drum and gripper, and Fig. 22 is a similar view thereof showing also the gripper operating cam taken in section on the line 22—22 of Fig. 23.

Fig. 23 is a transverse section of the extractor taken on the line 23—23 of Fig. 22, with the cam shown in left elevation.

Figure 24:
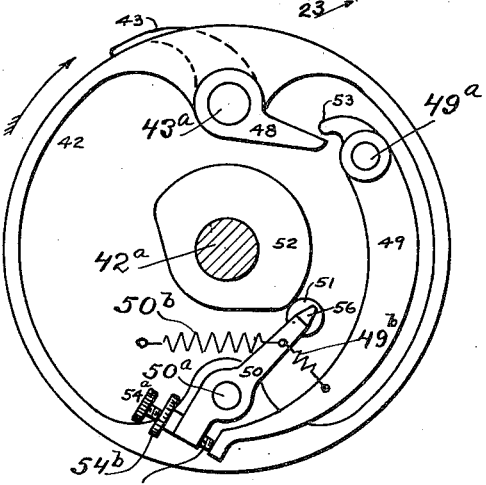

Fig. 24 is a rear elevation of the rotary extractor device.

Fig. 25 is a top plan view of a modified portion of the mechanism. Fig. 26 is a left end elevation thereof. Figs. 27 to 30 are diagrams showing successive positions of certain parts. Fig. 31 is a longitudinal section of the parts involved in said diagrams and adjacent parts. Fig. 32 is an elevation thereof looking toward the left side of Fig. 31. Fig. 33 is a similar elevation looking toward the right side thereof.

Signatures S are shown stacked in Figs. 1 to 7, and in process of separation, extraction, delivery and accumulation in various figures. While a signature may be considered as composed of various numbers of sheets, even as low as 1 or 2, the usual signature is produced from a large printed sheet which is folded and refolded at least twice so that it will comprise 4 or 8 or 16 or a greater number of sheets. Assuming such a signature for the purposes hereof, this possesses a single thick fold S' at what is known as the back edge of the signature, to be bound in at the back of the completed book. On Fig. 4 the edges of the signature are suitably inscribed. At the head $S^2$ of the signature there are usually two folds, except on what are known as open head signatures, which have no folds at the head end but only loose sheets. Opposite the head end is the signature foot $S^3$ at which are loose sheet edges, which unavoidably present numerous irregularities for one reason or another. Opposite to the back is the signature front edge $S^4$, which will come at the front or open side of the book.

In signature gathering the back edge S' and the head end $S^2$ are the gaging points for the alinement of the grouped signatures, which are to be understood as being jogged into line at these two edges, in a well known manner; the jogging means being omitted from the disclosure hereof.

With these considerations in mind one principle of the present invention is to extract each signature from its stack by pulling it out endwise by its foot, instead of laterally by its back; so that when so extracted and delivered advancingly to the traveling conveyor the foot end will be foremost and the head end will be contacted by the pushing or alining means or pin of the conveyor, as is necessary for the correct alinement of the heads of the grouped signatures. By reason of this operation it is necessary to separate from the stack and thereupon grip and withdraw from the stack each foremost or lowermost signature by its foot end, which is the end composed of loose sheet edges not accurately alined and disclosing irregularities.

The usual mode of suction separation as used at the back is inadequate for the foot because it would tend to separate only the lowermost sheet of the signature rather than the entire signature. According to this invention the initial separation is effected not merely at the foot end but near the corner $S^5$ adjacent to both the back and the foot. The initial or suction separation at this point bends downwardly the corner $S^5$, and according to this invention a supplemental or rotary separator then comes into action, entering above the bent down corner $S^5$ and thereupon moving along to extend the separation across the entire foot end of the signature, holding it in this bent down separated position until the grippers of the extractor have engaged the signature by its entire thickness at its foot end, so that the signature will be extracted properly and will be delivered properly to the conveyor with its foot end foremost.

The general parts of the machine comprise a bed or floor plate 1 from which upstand a number of supporting legs 2, on the upper front part of which is mounted a longitudinal girder 3 extending the entire length of the machine. As seen in Fig. 1 the girder 3 is set at a forward incline from the vertical, the legs being shaped to support the girder in this position; and all of the carried mechanisms assume generally this forward slant, so that the signatures tend frontwardly by gravity into contact with the front walls or bars of their boxes or hoppers. Mounted on top of the girder 3 is a system of upstanding brackets 4 which give support to longitudinal bars 5 and 6 which in turn support the members constituting the walls of the several hoppers, of which there may be an indefinite number, four being shown in Fig. 2. Connecting the lower back sides of the hoppers is a longitudinal bar 6ª similar to the bar 6. Bearings 7 for the gripper drum shaft 42ª to be described are mounted upon the girder 3, the front end of each bearing being extended into a hollow casing 7ª which encloses a worm gear 10 on the shaft 42ª and a worm 9 driving the worm wheel, the several worms 9 being mounted on a common longitudinal driving shaft 8 turned uniformly by electric or other power.

The signature hoppers stand at the forward incline already mentioned and they are preferably of open construction, their walls consisting of upstanding bars by which the signatures are positioned so that they will be in correct relation to the separating and extracting means to be described. Thus each hopper comprises at the left or foot end of the stack of signatures an upstanding bar 11, the lower end 11ª of which is curved outwardly and around to form a guard adjacent to the extractor drum. At the right or head end is a bar 12 against which the head ends $S^2$ of the signatures contact. While not shown adjustable it is understood that the hopper wall or bar 12 may as usual be adjustable longitudinally for different sizes of signatures. At the front or lower side are a pair of bars 13 against which the back edges of the signatures rest.

Underlying the stack in each hopper is a bottom plate 14 extending between the longitudinal bars 6 and 6ª and upon which the head bars 12 may be mounted. The foot end bar 11 may be mounted on a special upstanding bracket 11ᵇ taking its support from a longitudinal member such as 3 or 15ª. As seen in Fig. 3 the bottom plate 14 terminates short of the left or foot end of the hopper so that the foot end of the lowermost signature is exposed underneath for separation and extraction. Preferably to the left of the bottom plate 14 is a roller 14ª over which the signature being extracted may run to minimize friction.

Describing next the conveyor or device by which the accumulating signatures are advanced progressively beneath the successive hoppers, this may comprise the usual supporting plate or trough 15, inclined as shown in Fig. 1, and having an upstanding wall 15ª at its front edge, so that the signatures may be properly delivered and received on the plate 15 and progressively slid along by suitable means. The incline assists to jog or aline the signatures in a lateral direction.

The trough bottom plate 15 is shown as formed with a longitudinal depending pocket or bottom groove 15ᵇ through which travels the conveyor chain 16. This chain carries upstanding pins 17 which are thus moved along by the chain and serve as pushers to convey the accumulating groups along, in this case in a rightward direction, toward the final discharge or to the means which transfer the successive groups to the stitcher or other binding mechanism. The conveyor trough or support 15 is shown formed also with a front pocket or groove 15ᶜ through which the return stretch of the chain and the pusher pins 17 travel back to the left end of the machine, where they travel around an idler sprocket wheel 16ᵃ.

The conveyor chain and pusher pins may be actuated from the drive shaft 8 already mentioned, namely through one of the transverse shafts 42ᵃ, thus preserving coordinate timing. As seen in Fig. 2 the right hand shaft 42ᵃ carries a sprocket wheel 18 which drives a sprocket chain 18ᵃ which in turn rotates a sprocket wheel 19, as seen also in Fig. 1. The sprocket wheel 19 is mounted on a transverse shaft 19ᵃ which carries at its rear end a bevel gear 20 driving a bevel gear 21 on an upwardly extending shaft 22ᵃ carrying at its upper end the sprocket wheel 22 which directly engages and drives the conveyor chain 16. If the conveyor chain 16 is to be carried into the stitching or binding mechanism, it will not travel around the sprocket 22.

The pins 17 are shown spaced the same as the spacing of the hoppers, in which case, one extracting revolution of the shaft 7 will cause conveyor travel to the extent of such spacing. Obviously the pins may have a different spacing, for example closer together, in which case the separating and extracting devices for the successive hoppers will be operated dissimultaneously.

The separating means hereof comprises a rotary separator or wheel 23 and a suction separator 24. The latter initiates the separation at the corner S⁵, tilting to pull down the corner by suction. In the meanwhile the supplemental separator has acted to uphold the stack at the corner, in the position shown in Figs. 1-7, but then releasing the corner to the initial separator for the latter to operate, and thereupon entering between the separated lowest signature and the stack and again assuming the weight of the stack while the suction separator retracts to let drop the lowest signature and then advances again to start the separating action on the next signature; the lowest signature being thrust down by the wheel to where the extractor may engage and withdraw it.

The upturned position of the signature stack corner is thus of operative value. It arches and prevents sagging of the foot edges of the signature where they extend leftward of the hopper bottom; and thereby prevents interference with the separation and gripping of a single signature at a time. But also it affords extra space or clearance for overlap of actions, for while the bottom signature is being extracted and the separator wheel is handling the next signature and upholding the stack, the suction separator may be entering between and assuming position to act upon the third signature. The suction separator thus is kept busy, its actions are extended over a longer part of each cycle and its motions are easier and more effective; while the separator wheel, being preferably in constant rotation, as is also the extractor drum, possesses an easy, quiet and effective action in coordination with the initial separation and the extraction.

The action is comparable to an escapement. The two separators alternately engage and disengage the signature series, and in each cycle one signature escapes downwardly. The initial separator 24 may be considered as a detacher, separating away by suction the foremost signature at the corner; while the final separator or wheel 23 is a depresser or releaser, depressing or allowing the release of the entire end of the detached signature. Importantly, the bent-up corner of the stack should be upheld, and this function is shown performed alternately by the detacher or initial separator and the releaser or final separator; although cooperating supporting means might be operated to move into and out of supporting position to the same effect.

The detaching separator 24 is adapted to swing outwardly or frontwardly away from the signature stack and inwardly or rearwardly into contact with the lowest signature, these two positions being indicated in Fig. 4; and it is adapted also to tilt between its position shown in Fig. 17 where it can engage the signature by suction and the position shown in Fig. 18 where it has sucked down and detached the lowermost signature corner. The suction detacher 24 is shown as composed of a suction head 27 from which extends upwardly a sucker in the form of a rubber cone 28, the head being hollow and communicating suction to the cone. The device also includes an extension or wing 41 in the nature of an abutment or contact which contacts with the lowest signature as shown in Fig. 17 when the device is swung in, and remains in contact with it as in Fig. 18 when the sucker head is tilted down. This result is attained by arranging the wing or contact member 41 at the axis of tilting of the device, and the contact forms an abutment which supports the weight of the signature stack at the corner, upholding the stack during the period when the releasing separator or wheel is disengaging the foremost signature and reengaging behind the next one. The suction device comprises also a hollow shank mounted as will be described, and upstanding from the shank is a tubular extension or stem 29 from which a flexible or rubber air hose 29ᵃ may extend to suitable pneumatic devices, not herein shown, by which suction is applied to the sucker at the time that it is required to detach the lowermost signature corner, and thereafter removed.

The hollow sucker head 27 is extended in the form of a shaft 27ᵃ which can rock within a bearing sleeve 26ᵃ mounted at the lower end of a vertical shaft 26 which can turn within a bearing bracket 25 secured to one of the back bars 13 of the hopper. By this arrangement the rocking of the shaft 26 serves to swing bodily the sucker head frontwardly and rearwardly. As already pointed out the contacting wing 41 of the sucker device is in axial line with the sucker shaft 27ᵃ so that the sucker can tilt bodily about said axis without causing the wing to loose its abutting contact with the signatures.

Inside the bearing 25 and surrounding and cooperating with the vertical shaft 26 is a vertical sleeve 31 which at times rocks with the shaft, during the bodily swinging of the suction device and at other times rocks relatively to the shaft for the purpose of causing tilting movements of the sucker head. For this purpose the sleeve 31 is shown as carrying at its lower end, below the bearing 25, a toothed collar 30, the teeth of which engage the teeth of a toothed flange 27b mounted on the sucker head shaft 27a adjacent to the bearing sleeve 26a, as best seen in Fig. 8. When the vertical shaft 26 and sleeve 31 turn together the entire suction device swings bodily, but when the sleeve rocks in relation to the shaft then the toothed collar 30 turns the toothed flange 27b and thereby rocks the sucker head.

The cooperative movements of the vertical shaft 26 and sleeve 31 may be effected in timed coordination by the following mechanism. The shaft 26 extends upwardly through the sleeve and has a head 26b. Between the head 26b and the bearing 25 is a collar 32a from which extends a rock arm 32, this collar being attached, not to the shaft, but to the sleeve 31. The lever 32 in turn is rocked from a knuckle 37 mounted on a longitudinal slide rod 36. The slide rod may extend the entire length of the machine and there may be a knuckle and rock arm adjacent to each hopper for the actuation of the suction detacher pertaining thereto. The longitudinal sliding of the rod 36 may be effected through a swivel block 36a at a convenient point on the rod, this block engaged by a yoke 35 formed at the extremity of the upper arm 34 of the lever pivoted on the horizontal frame bar 6, the lever having a lower arm 34a at the end of which is carried a cam roll operated by a cam 33 mounted on one of the transverse shafts 42a. A spring 34b tends to retract or pull rightwardly the lever arm 34 and the slide rod 36, thus to retract the suction detacher when permitted by the contour of the cam 33. These connections are best shown in Fig. 3, the cam 33 being shown also in Fig. 2.

The operation of these parts is such that when the cam 33 throws the lever the rod 36 moves leftward and the lever 32 swings leftward thus rocking the vertical sleeve 31 and with it the enclosed shaft 26. The sucker device is thus swung in towards operating position and at a suitable point the swinging of the sucker device and the rocking of the shaft 26 will be caused to stop, following which the continued rocking of the sleeve 31 operates through the toothed members 30 and 27b to rock the sucker head shaft 27a and thus tilt the sucker device and pull down the corner of the lowermost signature. The stopping of the bodily swinging movement may be effected by means of a fixed stop lug 38 projecting from the vertical bearing 25 and a swinging stop lug 39 projecting from the lower head 26a of the vertical shaft. See Figs. 3 and 4. When these contacts meet the rocking of the shaft 26 and its head 26a ceases while the rocking of the sleeve 31 continues, thus causing the rocking of the shaft 27a and the tilting of the suction device. This tilting motion is resisted by a spring 40a extending from the lug 39 to a lug or arm 40 extending from a collar 27c mounted at the right end of the tilting shaft 27a. Normally the lug 40 is held by the spring 40a in contact with the lug 39. By this arrangement the swinging of the lever 32 first swings inwardly the sucker device 24 and then rocks it upwardly until the sucker contacts the lowermost signature corner, at which time the suction valve will be opened; the reverse movement of the lever 32 first tilts down the sucker, by the action of the spring 40a, thus detaching and pulling down the lowermost signature corner. About this time the point or horn of the separating releaser or wheel 23 begins to enter the gap above the detached signature corner, and as soon as it has reached a position where it is able to support the signature stack at the corner then the suction is released and the sucker head is again bodily swung outwardly or frontwardly to initial position, completing its cycle of movement. The wing or contact 41 of the sucker device serves not only to support the signature corners, and to prevent any but the lowermost signature being detached and bent downwardly, but serves also to establish a definite bending line for the lowermost signature corner, rendering more certain the suction detaching action. Figs. 17 to 20 show the sucker device in its inward and outward positions and in its tilted and level positions, Fig. 19 showing how the separator wheel commences to enter and support the remaining signatures before the lowest signature is disengaged by the outward swinging of the sucker device.

Referring further to the supplemental or releasing separator or wheel 23, this is best shown in Figs. 3 and 4 and in the diagrams Figs. 12 to 16 and Figs. 17 to 20. The wheel is a rotary disk of irregular shape, turning counter-clockwise as seen from above. It is provided with a forwardly projecting point or horn 23a adapted to enter between the detached lowest signature corner and the signatures above, as seen in Figs. 18 and 19, operating somewhat like a rotary shuttle. Following the entering horn 23a is a concentric portion 23b which is preferably progressively thickened by a downward extension as well shown in Figs. 3, 18 and 20. As soon as the horn has well entered the signature space, so that the wheel portion 23b is in supporting relation to the signatures thereabove, the suction detacher 24 may tilt down to level position and swing frontwardly as indicated in Fig. 19; and from this point on the releasing wheel supports the stack corner until it reaches the point where the next signature above is to be released to the suction detacher. The contour of the wheel or disk 23, following the concentric portion 23b, comprises a shoulder 23c followed by a concentric portion 23d of reduced radius, this arrangement affording a clearance, as seen in Fig. 15, permitting the suction detacher to commence its inward movement for the next separating operation. Finally the disk or wheel 23 is formed with a sharply dropping off contour 23e, which allows the wheel to clear momentarily the signatures, as seen in Fig. 13, thus permitting the action of the suction detacher on the succeeding signature and the reentry of the point 23a thereabove.

The separator wheel 23 may be mounted in any convenient manner, for example upon a short shaft 70 turning in a bearing 71 extending from the bracket 11b, the shaft carrying a bevel gear 72 which engages a bevel gear 73 mounted on a counter shaft 74 turning in a longitudinal bearing 75 on the bracket 11b. At its left end the counter shaft 74 carries a sprocket wheel 76 which is driven by a sprocket chain 77 operated from a sprocket wheel 78 mounted on the driving shaft 8. The two separator devices, the detacher 24 and the releasor or depresser 23, are thus both actuated in unison from the same transverse shaft 42a, which makes one turn per cycle, and this same shaft actuates also and times the extractor device therewith.

Cooperating with the separating means is an extractor device adapted to grip the detached and depressed lowermost signature by its foot end 8², draw it out from the bottom plate 14, underneath the stack, and deliver it to the conveyor. This is shown as a rotary extractor device comprising a drum 42 formed in two sections against the periphery of each of which operates a gripping finger 43. These duplicate devices are somewhat analogous to the paper feeding devices of printing presses, the two drum rims and the two swinging fingers constituting a rotary gripper adapted to grip the signature end and pull the signature out and around, delivering it downwardly and forwardly in a direction the reverse of its extraction. This smooth operating extracting means may be maintained in continuous rotation, at variable or uniform speed. It is herein illustrated in Figs. 1, 2 and 3 and the details of construction in Figs. 21 to 24, of which Fig. 21 shows the gripper 42, 43 open, the other figures showing it closed upon the signature S.

The drum member 42 of the rotary gripper is shown turned uniformly by the transverse shaft 42ª on which it is mounted. The drum is cut away at 42ᵇ and 42ᶜ as shown in Fig. 21 to form a recess for the operation of the gripper finger 43, which is mounted on shaft 43ª so as to swing from the position shown in Fig. 21 to that shown in Fig. 22 as the drum revolves. The quick swinging movement of the finger brings it on top of the signature end resting on the rim of the drum, the continued motion of the drum pulling the signature from beneath the stack and conveying it around the drum to the lower side for delivery.

The gripper finger may be operated in various mechanical ways. For example the finger shaft 43ª is shown carrying a toothed segment 43ᵇ which segment is engaged by a toothed segment 44 of longer radius, mounted on an arm 44ª turning loosely on a shaft or axle 44ᵇ, so that the swinging of the arm effects a quick operation of the gripper.

For certain purposes the actuation of the arm 44 may be as follows. Mounted on the same shaft or axle 44ᵇ is shown a second arm or lever 45, its end normally abutting the end of the segment 44. A strong spring 45ª pulls the two arms toward each other, so that this system normally rocks as a unit. On the arm 45 is shown a cam roll 46 by which the rocking motion is effected. The cam roll 46 engages the groove of a cam 47 shown in section in Fig. 22 and in left elevation in Fig. 23. The cam 47 is fixed in position, being an extension of the bearing 7 in which the transverse shaft 42ª rotates.

The gripper opening and closing cam 47, being fixed, operates by reason of the rotation of the drum and gripper device, and it is so shaped, with concentric and eccentric portions, as in Fig. 22, that the gripper finger is swung wide open to the Fig. 21 position until the finger passes the edge S³ of the signature whereupon the finger is swung reversely to the closed position of Fig. 22, gripping the signature against the drum rim, after which the cam is concentric, as seen in Fig. 22, thus holding the signature gripped until the finger is released substantially at the lowest part of its travel when the cam again opens the gripper effecting delivery of the signature directly or indirectly to the conveyor. The thickness of the signature in the gripper prevents the complete throw of the finger, and as seen in Fig. 22 this causes a corresponding gap between parts 44 and 45, so that it is the pull of the spring 45ª and not the positive pressure of the cam 47 that determines the gripping pressure, which is uniform for all thicknesses of signature.

It is important to have a caliphering device or a gage on a signature gatherer so as to give a warning of any error causing a variation in the correct thickness of the signature group. The detection of the erroneous thickness of the signature group may be employed either or both to throw a visual signal and to stop the operation of the machine until the necessary correction is made.

This detection and correctiion is herein performed by the gripping fingers 43 themselves, since variation of signature thickness will determine the throw of the fingers, as plainly seen in Fig. 22, and therefore the extent of rocking movement of the finger shaft 43ª. The detecting parts are seen in the back view Fig. 24 wherein, attached to the rear end of the shaft 43ª, is a lug or finger 48, shown in its operative position. Cooperating with the lug 48 is a lug or short arm of a lever having a long arm 49, this lever being mounted on a pivot shaft 49ª on the web of the extractor drum. Variations in signature thickness are thereby multiplied considerably at the extremity of the lever arm 49.

In order to secure further multiplication of movement and thus increase accuracy of gaging control a second lever 50 is shown mounted on a pivot shaft 50ª; the two levers in cooperation forming a compound lever. While the lever 49 might be in pivotal connection with the short arm of the lever 50, or connected by a link, it is shown abutting against a contact 54 projecting from the short arm of the lever 50. The contact 54 may be adjusted by a thumb screw 54ª, and the adjustment held by a lock nut 54ᵇ. This arrangement permits a very fine adjustment, preferably effected by inserting an actual signature in the gripper, causing a closing of the gripper, and then adjusting the screw contact 54 to set correctly the trip device to be described.

A spring 49ᵇ is shown pulling the lever 49 toward the lever 50 and a spring 50ᵇ is shown pulling the lever 50 so as to cause engagement of a cam roll 51, at the free extremity of the lever 50, with a fixed cam 52 surrounding loosely the drum shaft 42ª. The controlling or tripping element is a projection or lug 56 extending rearwardly from the extremity of the lever 50, this tripping projection therefore having a multiplied radial movement controlled by the thickness of the signature. The purpose of the cam 52 and roll 51 is to prevent the lug 48 from striking or impacting the lug 53 at every swing of the gripper as the gripper comes to its closed position. As will be clear from Fig. 24, where the gripper is shown in its closed position, the lugs 48 and 53 are still out of contact, but as the rotation of the drum 42 continues the cam roll 51 wil ride down on the sloping part of the cam 52 and thus bring the lug 53 gently into gaging contact with the lug 48. This arrangement eliminates wear, tear and noise.

The tripping lug 56, the radial position of which is determined by the thickness of the signature being extracted, cooperates with the forked or slotted end 55ª of a trip lever 55 as well shown in Fig. 23, with details in Figs. 1, 10 and 11. When the signature is of proper thickness the trip lug 56 will come around in usual rotation at the proper position to pas through the fork of lever 55. Whenever, however, an imperfect signature is gripped, either thicker or thinner than a proper signature, or when no signature is separated from the stack, or more than one signature, the trip lug 56 will obviously be displaced radially and will occupy such displaced position at the time of passing the trip lever 55; and being out of position will not pass through the fork of the lever but will strike the lever and cause the swinging of the lever. The trip lever 55 is shown as turning on a fulcrum 55$^b$ on Fig. 1. Its rear arm 55$^c$, when the lever is tripped, is caused to strike upon an electric switch or button 57, either to open or close a circuit, and thereby cause the stoppage of the machine.

An indicator or signal may be simultaneously operated, for example as follows. The trip lever 55 has a rightwardly extending arm 55$^d$, the extremity of which normally rests beneath an inclined rod 58, the top of which gives support to a signal 59 comprising an inclined arm pivoted at the top of the front wall 13 of the hopper. The rod 58 slides vertically through a guide bracket 60 but is normally held in its upward position shown in full lines in Fig. 1 by the presence of the rightward arm 55$^d$ of the trip lever. When however a defective signature is encountered and the lever is tripped the rod 58 loses its support, the signal thereupon dropping to the dotted line position and giving visual indication as to which hopper contained the defective signature.

As seen in Fig. 3 there may be provided a curved delivery plate 61 supporting the signature S received from the extractor drum and supporting it until deposited on the conveyor trough, namely on top of the signatures already gathered in front of each pin 17. This delivery plate 61 may be in the form of two or more strips, one or more on each side of the conveyor pins, as best shown in Figs. 1 and 3. The pins 17 are of such height as to extend not merely above the lower portion of the delivery plate 61, but so as to pass between the two sections of the extractor drum 42. In consequence each signature delivered to the plate 61 is in the path of the following conveyor pin and as already stated is delivered to the plate 61 with a forward or rightward travel, as fast as or faster than that of the following pin, so that there will be little or no impact when the pin passes forwardly into pushing contact with the head end S$^2$ of the signature. In this way each signature is properly headed up or alined in relation to the pusher pin before it passes from the delivery plate and is deposited upon the already accumulated signatures. The pin marked 17$^x$ and the signature marked S$^x$, shown in dotted lines in Fig. 3, do not represent the true positions of these parts, but are diagrammatically superimposed on the figure to indicate that each signature is deposited on the delivery plate in forward motion, and with its head end slightly in advance of the following conveyor pin. The signatures are thus jogged or headed up longitudinally in this manner, and laterally the back edges S' of the signatures are jogged or headed up by their contact with the front wall 15$^a$ of the conveyor trough supplemented by any usual jogging means.

Associated with the delivery plate 61 is shown a swinging lever 62 carrying a roller 63 arranged to bear upon the signatures being carried around by the extractor drum 42. The lever 62 is shown fulcrumed at 64 while a spring 65 is arranged to cause a resilient pressure of the roll toward the drum, thus holding the body of the signature more snugly to the drum until the signature finally passes completely out of engagement with the drum and roll.

The operation may be described in connection with Figs. 12 to 20 and others as follows. As already stated the exposed corner S$^5$ of the stack of signatures is to be held in an upwardly bent position, alternately acting means taking the weight of the stack as each lowermost signature is detached, separated and removed. Specifically the corner supporting means are associated with the respective separating devices 23 and 24. Thus the point or nose 23$^a$ of the separator wheel, after it enters above a detached signature, assumes the weight, and the remainder of the wheel around to the Fig. 13 position continues to give support. During the short period when the wheel or disk 23 is not supporting the stack it is being supported by the wing or contact 41 of the suction detacher device. By thus associating the alternate supporting means with the respective separating devices the operation is considerably simplified; although manifestly separate supporting devices might be used moving into and out of position in coordination with the operations of the separators. The holding up of the signature corners forms a diagonal bend which operates also to uphold the foot edges of the signatures along the entire width of the hopper.

Commencing with the position shown in Figs. 12 and 17 the detacher or suction separator 24 has been moved inward and tilted upwardly, the suction has been applied, and the detacher is about to tilt down and pull with it the lowermost signature at the extreme corner, the signature thus being bent along a definite diagonal line determined by the wing 41. In this position, and for a while thereafter, the wing or contact 41 upholds the stack at the corner. The mechanical separator or disk 23, not shown in Fig. 17, is shown in Fig. 12 as approaching its entering position.

In the position of Figs. 13 and 18 the suction separator has tilted down and pulled with it the lowermost signature corner about the line 41, the remaining signatures retaining their position by their own resistance. The wing 41 still upholds the weight of the signature corners. The separating disk is about to enter above the detached signature corner, its horn or nose 23$^a$ approaching above the suction separator in an inclined plane at right angles to the shaft 70 of the disk.

Figs. 14 and 19 show that the suction has released the detached signature corner and the suction separator 24 has started to retract outwardly, while the disk 23, or its nose 23$^a$ has entered substantially the space above the detached signature corner and has assumed the weight of the stack corner, preventing the sagging of the signatures.

In the position of Fig. 15 the suction separator 24 has retracted forwardly entirely beyond the signature back edge, thus clearing the previously detached signature and leaving it in the control of the separator disk, which continues its support of the weight of the stack corner. This figure shows also that the suction separator 24 may now start inwardly above the separated signature so as to assume its supporting and detaching position for the next signature above.

Figs. 16 and 20 show the same position as is shown in Figs. 3 and 4, the separated signature being shown fully depressed by the thickened or wedge shaped portion 23$^b$ of the disk, this indeed bringing the foot edge of the signature down upon the extractor drum. The suction separator has resumed its inward position in readiness for the next detaching operation and in this position both of the separators may be affording support to the corner of the signature stack.

Immediately after the separated signature is thus fully depressed the extractor gripper grips the foot end of the signature as shown in Figs. 2, 3 and 22, and commences drawing the signature out from the bottom of the stack. While this extraction is taking place the suction separator may be in the act of detaching the next signature above, while the separating disk moves around again until the position of Figs. 12 and 17 is again reached, and the cycle is repeated.

The rotary extractor drum grips each signature in the position shown in Figs. 3, 4, 16 and 20, carries it circularly downward and around for discharge in the opposite or forward direction upon the delivery plate slightly in front of one of the pins 17. The speed of travel of the extracted gripper can be made the same speed as that of the conveyor, or a somewhat faster speed, by constructing the extractor drum of such diameter as to possess the peripheral speed required.

As the extractor gripper passes the idler roller 63 it opens to release the signature for delivery upon the plate 61; and the forward travel of the signature and the completion of its delivery are effected by the cooperation of the roller 63 pressing the signature against the periphery of the drum. When the signature has been completely delivered from the drum and roller the next conveyor pin soon overtakes the head end S² of the signature, picking it up on the run with little or no impact and thrusting it forwardly on the delivery plate, which slopes gradually downwardly so that the signature when eventually pushed from the plate is substantially in position upon the previously accumulated signatures. By reason of the conveyor pin overtaking each signature on the run, with substantially no impact, the mechanism is able to handle thin or flimsy signatures at exceedingly high speeds.

While there has been shown for detaching the corner of the lowest signature a suction separating device which reciprocates or swings inwardly for its detaching operation and thereafter retracts outwardly, this function may be performed by devices operating otherwise, for example with continuous rotary motion rather than an inward and outward swinging. See Figs. 25 to 33. In such construction there may be provided a detaching wheel 125 turning continuously about a diagonal axis slightly below the corner of the signature stack, and carrying a rocking or planetating sucker head 127 turning oppositely to the wheel. The sucker 128 engages and detaches the corner of the lowest signature and moves it down with a rolling action. By these arrangements substantially all reciprocating motion is eliminated and the operation rendered smooth by the rotary motion of the described parts.

The modification of Figs. 25 to 31 shows a rotary depresser or wheel 123 similar to the depresser 23 shown in Figs. 3 to 20, and shows also gripper wheel 142 and fingers 143 similar to the corresponding parts 32 and 43 of Figs. 1, 3 etc. Similarly, the modified figures show a hopper comprising a bottom 114, vertical foot bar 111 and back bar 113, the stack of signatures however being omitted. Beneath the described parts is a signature support 115 along which the accumulating signature groups are conveyed. Longitudinal operating shafts 108 and 108ª are shown.

The rotary detacher 124 comprises a body portion 125 to which is attached a gear 126 by which it is rotated. These parts are shown as turning on a fixed stud or stem 129 which also is hollow and serves as a suction connection, Fig. 25 showing a flexible air tube 130 connecting to the hollow stem 129, the latter being mounted in a bracket 131. The suction detacher 124 comprises a suction head 127 mounted on the rotary body 125 in an eccentric position. This suction head 127 may be composed of rubber and is formed with a cone or sucking cut 128 adapted to engage the diagonal corner of the lowermost signature.

The suction head 127 is of a planetary or rocking character, so that it travels bodily around with the gear 126 while undergoing rotary movements on its own axis. For this purpose the head 127 is shown mounted on an eccentric or planetary shaft 132, extending through the body 125 parallel to the fixed stem 129. The gear 126 is connected for continuous rotation from the drive shafts and by this arrangement the suction head is carried bodily around. Its motion on its own axis may be effected by a pinion 133 mounted at the exterior end of its hollow shaft 132, said pinion being engaged by an idler pinion 134 mounted on the gear 126, and the idler pinion being in mesh with a central gear or pinion 135, held against rotation, for example by being mounted on the fixed stem 129.

These devices afford the actions indicated by the diagrams Figs. 27 to 30. Fig. 27 shows the diagonal stack corner as held up by the thin edge of the depressing wheel 123, while the rotary detacher 124 is turning in a manner to bring the suction head 127 into operative relation with the lowest signature corner. The detacher head planetates in a direction the opposite to the rotation of its carrier or body. As a consequence the head arrives in a tilting manner at the signature engaging position shown in Fig. 28. At this time the passages within the hollow stem 129 and shaft 132 are connected, suction being applied through the rubber tube 130, so that the sucker 128 grips the surface of the lowest signature. In the meanwhile the depresser 123 has withdrawn from signature supporting position. Continued rotation brings the parts to the position shown in Fig. 29 wherein the detacher has rotated further and the suction head has turned also on its axis, thus tilting or rolling the lowest signature corner away from the stack. As this detaching movement commences the forward edge of the depresser wheel 123 comes into position above the detached signature and below the balance of the stack, as Fig. 29 shows. Continued movement brings the parts to the position of Fig. 30, the lowermost signature having been completely detached and ready to be bodily depressed by the wheel 123, the suction having released the signature and the suction head undergoing a planetary retraction which eventually will bring it around again to the position of Fig. 27 for repetition of action.

A signature gatherer has thus been described attaining the objects of the present invention. Since many matters of operation, combination, arrangement and construction may be variously modified within the principles of the invention it is not intended to limit the invention to such matters except to the extent specified in the claims.

What is claimed is:

1. A gathering machine comprising a longitudinal conveyor having a series of forwardly moving pushers for advancing longitudinally the accumulating signature groups, a series of hoppers to support a series of stacks of signatures with their back edges longitudinal and their lateral foot edges exposed beneath at one end of the hopper, and for each hopper a detacher for separating downwardly the lowest signature corner adjacent the back and foot edges, a depresser for entering above each detached corner and deflecting the lateral foot edge into reach of an extractor, an extractor comprising gripper means for gripping the deflected foot edge of each signature, drawing it longitudinally from the hopper and delivering it with advancing longitudinal motion to the conveyor, and timed means for coordinately actuating the conveyor, the detacher, the depresser and the extractor.

2. A gathering machine comprising in sub-combination, a longitudinal series of hoppers to support a series of stacks of signatures with their foot edges extending transversely and exposed beneath, and for each hopper a suction member for detaching downwardly the lowest signature corner adjacent the back and foot edges, a separator member for entering above each detached corner and mechanically depressing the foot edge into reach of an extractor, an extractor comprising gripper means for gripping the depressed foot edge of each signature, drawing it longitudinally from the hopper and delivering it, and timed means for coordinately actuating the suction and separator members and the extractor.

3. A gathering machine comprising in combination, a longitudinally traveling conveyor for accumulating signature groups, a longitudinal series of hoppers to support a series of stacks of signatures with their back edges longitudinal and their foot edges exposed beneath, and for each hopper, means for separating the foot edge of each successive lowest signature and depressing it into reach of an extractor, an extractor comprising gripper means for gripping the depressed foot edge of each signature, drawing it longitudinally from the hopper and delivering it longitudinally to the conveyor in the same forward direction as the travel thereof, and timed means for coordinately actuating the conveyor, the separating means and the extractor.

4. A machine as in claim 3 and wherein the extractor comprises a rotary member or drum carrying a gripper and mounted to rotate about a transverse axis in a direction to draw out each signature in a direction the opposite to the conveyor travel and rotate it downwardly and forwardly for delivery to the conveyor.

5. A machine as in claim 3 and wherein the extractor comprises a rotary member or drum carrying a gripper and mounted to rotate about a transverse axis in a direction to draw out each signature in a direction the opposite to the conveyor travel and rotate it downwardly and forwardly for delivery to the conveyor; with means to rotate continuously the gripper drum, means to close and open the gripper during rotation, and a roller to press the signature against the drum after the gripper opens, to complete delivery.

6. A machine as in claim 3 and wherein is a delivery support receiving each signature from the extractor and delivering it to the conveyor; the support being longitudinally recessed and the conveyor having pushers upstanding through such recess to engage each signature on the run and push it from the plate and upon the conveyor.

7. A gathering machine comprising in combination, a longitudinally traveling conveyor for accumulating signature groups, a longitudinal series of hoppers to support a series of stacks of signatures with their back edges longitudinal and their foot edges exposed beneath, and for each hopper a detacher member for detaching downwardly the lowest signature corner adjacent the back and foot edges, a depresser member for entering above each detached signature corner and depressing the foot edge into reach of an extractor, an extractor comprising gripper means for gripping the depressed foot edge of each signature, drawing it longitudinally from the hopper and delivering it longitudinally to the conveyor in the same direction as the travel thereof, and timed means for coordinately actuating the conveyor, the detacher, the depresser and the extractor.

8. A machine as in claim 7 and wherein the detacher comprises a tiltable suction head with a contact extension or wing substantially at the axis of tilting to contact the signature and determine the line of bending of the signature corner, and connections to swing bodily inwardly and outwardly the suction head and to tilt the head to draw down the signature corner when in.

9. A machine as in claim 7 and wherein the detacher comprises a suction head adapted to engage and pull down each signature corner from a bent-up position, while the previous signature is being extracted, and having means to hold up the stack corner during detachment, and the depresser having means to hold up the stack corner while the suction head is retracted, whereby the suction head may enter the space above each detached corner to operate on the bent-up corner of the next succeeding signature.

10. A machine as in claim 7 and wherein the depressing member is continuously rotated and has a nose portion to enter between each detached corner and the signature above, and peripheral portions to extend the separation across the foot of the signature and to depress it to the extractor, and a reduced portion to clear each signature preceding the entry of the nose portion thereabove.

11. A gathering machine comprising in combination, a longitudinally traveling conveyor for accumulating signature groups, a longitudinal series of hoppers to support a series of stacks of signatures with their back edges longitudinal and their foot edges exposed beneath, and for each hopper means for separating the foot edge of each lowest signature and depressing it into reach of an extractor, a rotary extractor comprising a movable gripper for gripping the depressed foot edge of each signature, drawing it longitudinally from the hopper and delivering it longitudinally to the conveyor in the same direction as the travel thereof, a trip lug carried by the rotary extractor, multiplying connections actuated from the gripper for determining the position of the trip lug according to the thickness of the signature being gripped, means for holding retracted such connections while the gripper moves into gripping position and then allowing engagement thereof to position the trip lug, and an external trip part or lever operated by the trip lug when the signature thickness is not correct.

12. A gathering machine comprising a longitudinal conveyor having a series of continuously moving pushers for advancing the accumulating signature groups, a longitudinal series of hoppers to support a series of stacks of signatures with their back edges longitudinal and their foot edges exposed, and for each hopper means for separating the lowermost signature and depressing its foot edge into reach of an extractor, and gripper means for gripping the foot edge of each signature, drawing it from the hopper and delivering it with advancing motion to the conveyor in front of a pusher, whereby each pusher engages each signature on the run.

13. A gathering machine comprising the subcombination of a longitudinal series of hoppers to support a series of stacks of signatures with their back edges longitudinal and their lateral foot edges exposed beneath, and for each hopper means for holding in bent-up position the corners of the stacked signatures where the back and foot edges meet, and for detaching each lowermost signature by its bent-up corner and depressing its lateral foot edge, and an extractor comprising gripper means for gripping the depressed lateral foot edge of each signature, drawing it longitudinally from the hopper and delivering it with advancing longitudinal motion.

14. A gathering machine comprising the subcombination of a longitudinal series of hoppers to support a series of stacks of signatures with their back edges longitudinal and their foot edges exposed beneath, and for each hopper a detacher operable in each cycle for separating downwardly the lowest signature corner adjacent the back and foot edges, a rotary disk operable in each cycle for entering above each detached corner and deflecting the foot edge into reach of an extractor, and an extractor comprising gripper means for gripping the deflected foot edge of each signature, drawing it from the hopper and delivering it with advancing motion.

15. In a gathering machine a longitudinal conveyor having a series of forwardly moving pushers for advancing longitudinally the accumulating signature groups, a series of hoppers to support a series of stacks of signatures with their back edges longitudinal and their lateral foot edges exposed beneath at one end of the hopper and their corners adjacent the back and foot edges substantially bent up above the planes of the signatures, and for each hopper means for holding upbent the signature stack corner and for separating the lowest signature for extraction, comprising a movable detacher for separating downwardly in each cycle the upbent corner of the lowest signature adjacent the back and foot edges, and a movable depresser for entering above each such detached corner in each cycle and deflecting the lateral foot edge thereof into reach of an extractor; in combination with a movable extractor comprising gripper means for gripping the deflected foot edge of each signature in each cycle, drawing it longitudinally from the hopper and delivering it with advancing longitudinal motion to the conveyor.

16. In a gathering machine a longitudinal conveyor having a series of forwardly moving pushers for advancing longitudinally the accumulating signature groups, a series of hoppers to support a series of stacks of signatures with their back edges longitudinal and their lateral foot edges exposed beneath at one end of the hopper and their corners adjacent the back and foot edges substantially bent up above the planes of the signatures, and for each hopper a detacher for separating downwardly the upbent lowest signature corner adjacent the back and foot edges, and having a part adapted to hold upbent the corners of the signatures thereabove when not upheld by the depresser, a depresser for entering above each such detached corner and deflecting the lateral foot edge thereof into reach of an extractor, and having a part adapted to hold upbent the corners of the signatures thereabove when not upheld by the detacher, an extractor comprising gripper means for gripping the deflected foot edge of each signature, drawing it longitudinally from the hopper and delivering it with advancing longitudinal motion to the conveyor, and timed means for coordinately actuating the conveyor, the detacher, the depresser and the extractor.

17. In a gathering machine a longitudinal conveyor having a series of forwardly moving pushers for advancing longitudinally the accumulating signature groups; a series of hoppers to support a series of stacks of signatures with their back edges longitudinal and their lateral foot edges exposed beneath at one end of the hopper, and for each hopper means for separating downwardly the lowest signature and deflecting the lateral foot edge thereof into reach of an extractor, a delivery plate spaced fixedly above the conveyor at both sides thereof and through which the pushers project and make contact with the signature on the run for delivering the signatures to the conveyor, and an extractor comprising gripper means for gripping the deflected foot edge of each signature, drawing it longitudinally from the hopper and delivering it with advancing longitudinal motion to the delivery plate; and timed means for coordinately actuating the conveyor, the detacher, the depresser and the extractor.

18. In a gathering machine a longitudinal conveyor having a series of forwardly moving pushers for advancing longitudinally the accumulating signature groups, a series of hoppers to support a series of stacks of signatures with their back edges longitudinal and their lateral foot edges exposed beneath at one end of the hopper and their corners adjacent the back and foot edges substantially bent up above the planes of the signatures, and for each hopper means for holding upbent the signature stack corner and for separating the lowest signature for extraction, by detaching its upbent corner and depressing its lateral edge into reach of an extractor, in combination with a movable extractor comprising gripper means for gripping the deflected foot edge of each signature in each cycle, drawing it longitudinally from the hopper and delivering it with advancing longitudinal motion to the conveyor.

19. A signature gathering machine comprising a longitudinal traveling conveyor for accumulating and advancing longitudinally the signature groups, a longitudinal series of hoppers to support a series of stacks of signatures with their back edges longitudinal and their lateral end edges exposed beneath the end of the hopper, and for each hopper a detacher for separating downwardly the lowest signature corner adjacent its back edge, a depresser for entering above each detached corner and deflecting downwardly the signature lateral end edge, gripper means for gripping each signature, drawing it longitudinally from the hopper and delivering it with advancing longitudinal motion to the conveyor, and timed means for coordinately actuating the conveyor, the detacher, the depresser and the gripper means.

20. A signature gathering machine comprising a longitudinal traveling conveyor for accumulating and advancing longitudinally the signature groups, a longitudinal series of hoppers to support a series of stacks of signatures with their back edges longitudinal and their lateral end edges exposed beneath the end of the hopper, and for each hopper means for separating downwardly the lowest signature corner at one end adjacent its back edge and for deflecting downwardly the signature lateral end edge, gripper means for gripping each deflected signature, pulling it longitudinally, extracting it from the hopper and delivering it longitudinally to the conveyor, and timed means for coordinately actuating the conveyor, the separating and deflecting means, and the gripper means.

21. A signature gathering machine comprising a longitudinal traveling conveyor having pushing means for advancing longitudinally the accumulating signature groups, a longitudinal series of hoppers to support a series of stacks of signatures with their back edges longitudinal and their lateral end edges exposed beneath the end of the hopper, and for each hopper means for separating the lateral end edge of each lowest signature from the signatures above it, and means for gripping such separated signature, for extracting it longitudinally from the hopper and delivering it with longitudinal advancing motion to the advancing conveyor, and timed drive connections for coordinately actuating the conveyor and said means.

PAUL E. KLEINEBERG.